a2 United States Patent
Gallagher (10) Patent No.: US 7,880,785 B2
(45) Date of Patent: Feb. 1, 2011

(54) ROD AND CONE RESPONSE SENSOR (75) Inventor: Paul K. Gallagher, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 1414 days.

(21) Appl. No.: 10/895,129

(22) Filed: Jul. 21, 2004

(65) Prior Publication Data
US 2006/0017829 A1    Jan. 26, 2006

(51) Int. Cl.
H04N 5/335    (2006.01)
(52) U.S. Cl. .................. 348/276; 348/279; 348/277; 348/294; 348/297
(58) Field of Classification Search .......... 348/276, 348/272, 273, 274, 279, 280, 297, 362
See application file for complete search history.

(56) References Cited

U.S. PATENT DOCUMENTS

| 4,334,239 | A | * | 6/1982 | Herbst et al. | 348/274 |
|---|---|---|---|---|---|
| 4,580,160 | A | * | 4/1986 | Ochi et al. | 348/276 |
| 4,764,813 | A | * | 8/1988 | Murayama et al. | 348/273 |
| 4,962,540 | A | * | 10/1990 | Tsujiuchi et al. | 382/165 |
| 5,898,509 | A | | 4/1999 | Bianchi et al. | |
| 6,366,319 | B1 | * | 4/2002 | Bills | 348/273 |
| 6,552,747 | B1 | * | 4/2003 | Hasegawa | 348/314 |
| 6,573,935 | B1 | * | 6/2003 | Yamada | 348/272 |
| 6,693,670 | B1 | * | 2/2004 | Stark | 348/308 |
| 6,714,243 | B1 | * | 3/2004 | Mathur et al. | 348/273 |
| 6,757,016 | B1 | * | 6/2004 | Ueno et al. | 348/279 |
| 6,759,646 | B1 | * | 7/2004 | Acharya et al. | 250/226 |
| 6,885,398 | B1 | * | 4/2005 | Sladen | 348/273 |
| 7,088,388 | B2 | * | 8/2006 | MacLean et al. | 348/234 |
| 7,095,441 | B2 | * | 8/2006 | Nagano | 348/308 |
| 7,336,306 | B2 | | 2/2008 | Oda | |
| 2001/0030708 | A1 | * | 10/2001 | Ide et al. | 348/362 |
| 2002/0044209 | A1 | | 4/2002 | Saito | |
| 2002/0180875 | A1 | * | 12/2002 | Guidash | 348/280 |

(Continued)

FOREIGN PATENT DOCUMENTS

EP    1 434 418 A1    6/2004

(Continued)

OTHER PUBLICATIONS

International Search Report and Written Opinion.

Primary Examiner—Sinh Tran
Assistant Examiner—Paul Berardesca

(57) ABSTRACT

An imager having color sensitivity in any lighting condition is provided by replacing at least one of the green color filtered pixels in a Bayer pattern array with an non-color filtered pixel and providing a different integration period for each color channel. When replacing a color filtered pixel with a non-color filtered pixel, the benefits of both color sensitivity and light sensitivity may be harnessed by providing the color filtered pixels with a longer integration period than the non-color filtered pixels. Color information may be interpolated by performing subtraction logic using non-color and color filter information from adjacent pixels in back-end processing. Integration times for each color channel can be adapted to minimize filter transmission and sensor absorption differences within each frame of data. Temporal displacement of colors of moving objects by having different integration periods may be corrected in back-end processing. Back-end processing may also correct motion blur.

34 Claims, 9 Drawing Sheets

Legend

= red    = green    = blue    = non-color

U.S. PATENT DOCUMENTS

| | | | |
|---|---|---|---|
| 2003/0112353 A1* | 6/2003 | Morris | 348/310 |
| 2004/0105021 A1 | 6/2004 | Hu | |
| 2005/0219666 A1* | 10/2005 | Ejima et al. | 358/539 |
| 2005/0248667 A1* | 11/2005 | Schweng et al. | 348/234 |

FOREIGN PATENT DOCUMENTS

| | | |
|---|---|---|
| JP | 57-095785 | 6/1982 |
| JP | 57-089385 | 9/1982 |
| JP | 58-75393 A | 5/1983 |
| JP | 4-88786 A | 3/1992 |
| JP | 9-116913 A | 5/1997 |
| JP | 2000-350222 A | 12/2000 |
| JP | 2002-135792 A | 5/2002 |
| JP | 2003-163937 A | 6/2003 |

\* cited by examiner

Figure 1 (Prior art)

Legend
= red
= green
= blue

ROD AND CONE RESPONSE SENSOR

FIELD OF THE INVENTION

This invention relates to imager devices and, in particular, to improved light sensitivity in pixel arrays.

BACKGROUND OF THE INVENTION

Humans perceive light energy of varying wavelengths as color, detected by two types of light-sensitive receptors in the retina of the eye, rod cells and cone cells. The rod cells detect only the quantity of light, working at even low light levels with fewer photons, also known as night-vision. They are stimulated by the intensity of light and are responsible for perceiving the size, shape, and brightness of visual images, but do not perceive color and fine detail. The cone cells, of which there are three types, each capable of detecting a different range of wavelength of light being received, require hundreds of photons to activate them. They are less sensitive to low illumination levels but provide color information. Of the three types of cones, each one contains a distinctive type of pigment, absorbing red light, green light, and blue light.

By contrast, digital imagers comprise an array of pixel cells, each one of the pixel cells including a photoconversion device, e.g., a photodiode gate, photoconductor, or a photodiode, for converting light into an electrical charge. In a CMOS imager, a readout circuit is connected to each pixel cell, which typically includes a source follower output transistor. The photoconversion device converts photons to electrons which are typically transferred to a floating diffusion region connected to the gate of the source follower output transistor. A charge transfer device (e.g., transistor) can be included for transferring charge from the photoconversion device to the floating diffusion region. In addition, such imager cells typically have a transistor for resetting the floating diffusion region to a predetermined charge level prior to charge transference. The output of the source follower transistor is gated as an output signal by a row select transistor.

Figure 1:
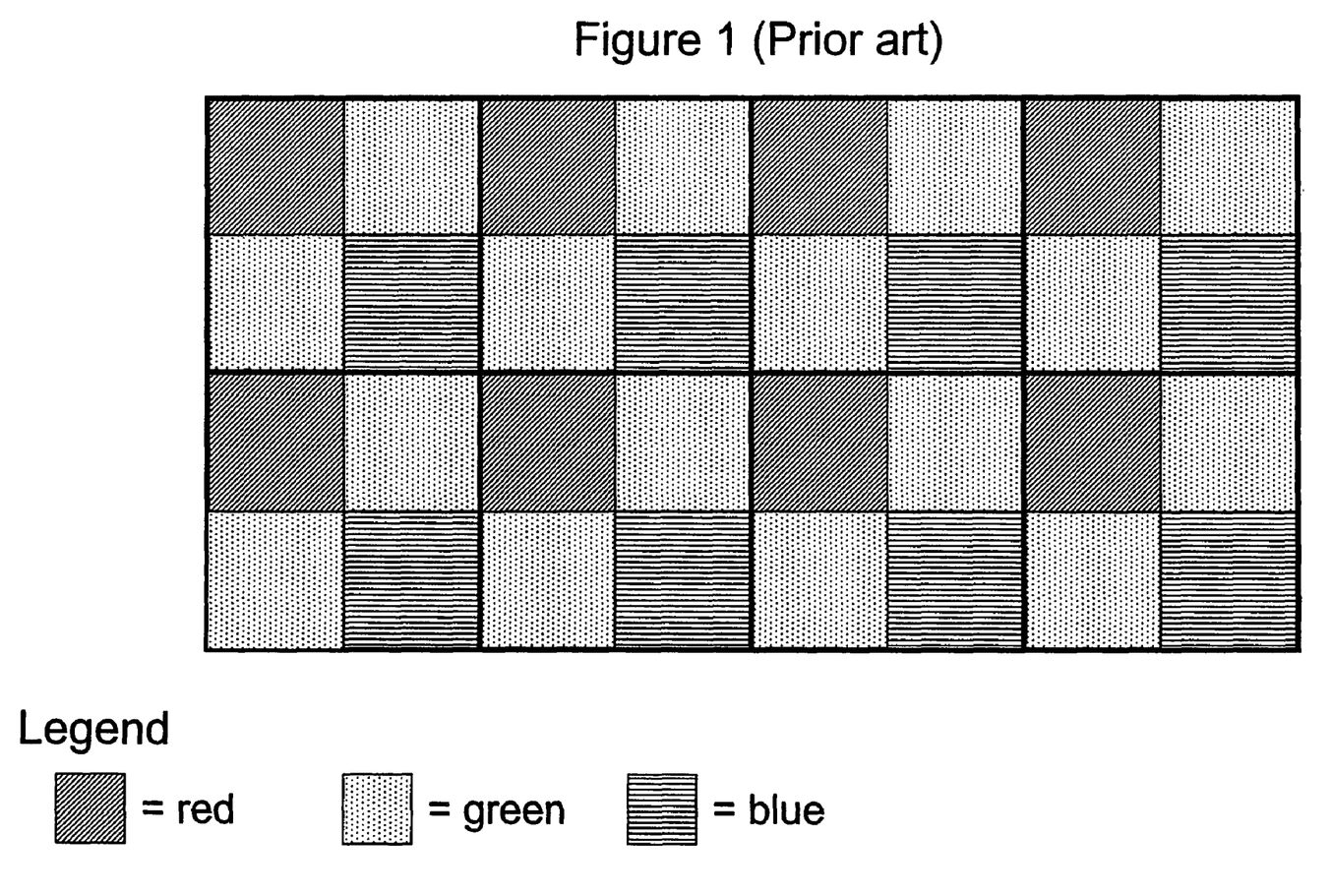
FIG. 1 depicts a pixel array of prior art.

In color imagers, the pixel cells also have a color filter over the surface of the sensor, which limits the specific wavelengths of light that may be permitted to enter the photoconversion device. A Bayer pattern filter of alternatively red and green filters in a first row, and green and blue filters in a second row is most commonly used in a typical 2×2 square of pixel cells, which is repeated for the entire array, as illustrated in FIG. 1. There is an emphasis on green filters due to human visual response, which reaches a maximum sensitivity in the green wavelength region (550 nm) of the visible spectrum. Hence, when processed, the green data provides not only chrominance information, but as its peak response is close to the peak response of the human eye, it is also used for luminance information.

Color filtered pixels, like cone cells, require a greater number of photons, relative to unfiltered pixel cells or rod cells, in order to produce an appreciable signal. This is largely due to the color filters themselves, which diminish transmissivity. Color imagers must also have a near-infrared (NIR) blocking filter in the optical path to assure that NIR energy is not absorbed by the color filtered pixels. However, in low light conditions, not only does the imager suffer from the color filter transmissive losses, but it also cannot take advantage of the NIR energy present without an additional mechanism to remove the NIR filter from the pixel array.

A monochromatic imager is able to take advantage of the NIR energy. The pixel cells in a monochromatic imager have neither color nor NIR blocking filters, and are therefore more sensitive to lower levels of incident light, including NIR energy. However, monochromatic imagers are incapable of capturing color information of images.

There is a desire and need for a color imager that can provide better images in low light conditions.

BRIEF SUMMARY OF THE INVENTION

Exemplary embodiments of the present invention provide an imager having color sensitivity and low light response sensitivity by replacing at least one of the color filtered pixels in a Bayer pattern array with a pixel without any color filter. A different integration period for the non-color pixel compared with the color filtered pixels may also be provided. For example, one or both of the green color filtered pixels of a Bayer pattern array may be replaced by an unfiltered pixel.

Since the photoconversion device of the unfiltered pixel, such as a photodiode, will likely saturate before any of the color filtered pixels, exemplary embodiments of the invention provide the unfiltered channels with a shorter integration period than those of the colored channels.

These and other features of the invention will be more clearly understood from the following detailed description which is provided in connection with the accompanying drawings.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized, and that structural, logical and electrical changes may be made without departing from the spirit and scope of the present invention.

The term "substrate" is to be understood as a semiconductor-based material including silicon, silicon-on-insulator (SOI) or silicon-on-sapphire (SOS) technology, doped and undoped semiconductors, epitaxial layers of silicon supported by a base semiconductor foundation, and other semiconductor structures. Furthermore, when reference is made to a "substrate" in the following description, previous process steps may have been utilized to form regions or junctions in or over the base semiconductor structure or foundation. In addition, the semiconductor need not be silicon-based, but could be based on silicon-germanium, germanium, or gallium arsenide.

The term "pixel" refers to a picture element unit cell containing a photosensor and transistors for converting light radiation to an electrical signal. For purposes of illustration, a representative pixel is illustrated in the figures and description herein and, typically, fabrication of all pixels in an imager will proceed simultaneously in a similar fashion. The following detailed description is, therefore, not to be taken in a limiting sense, and the scope of the present invention is defined by the appended claims.

Figure 4:
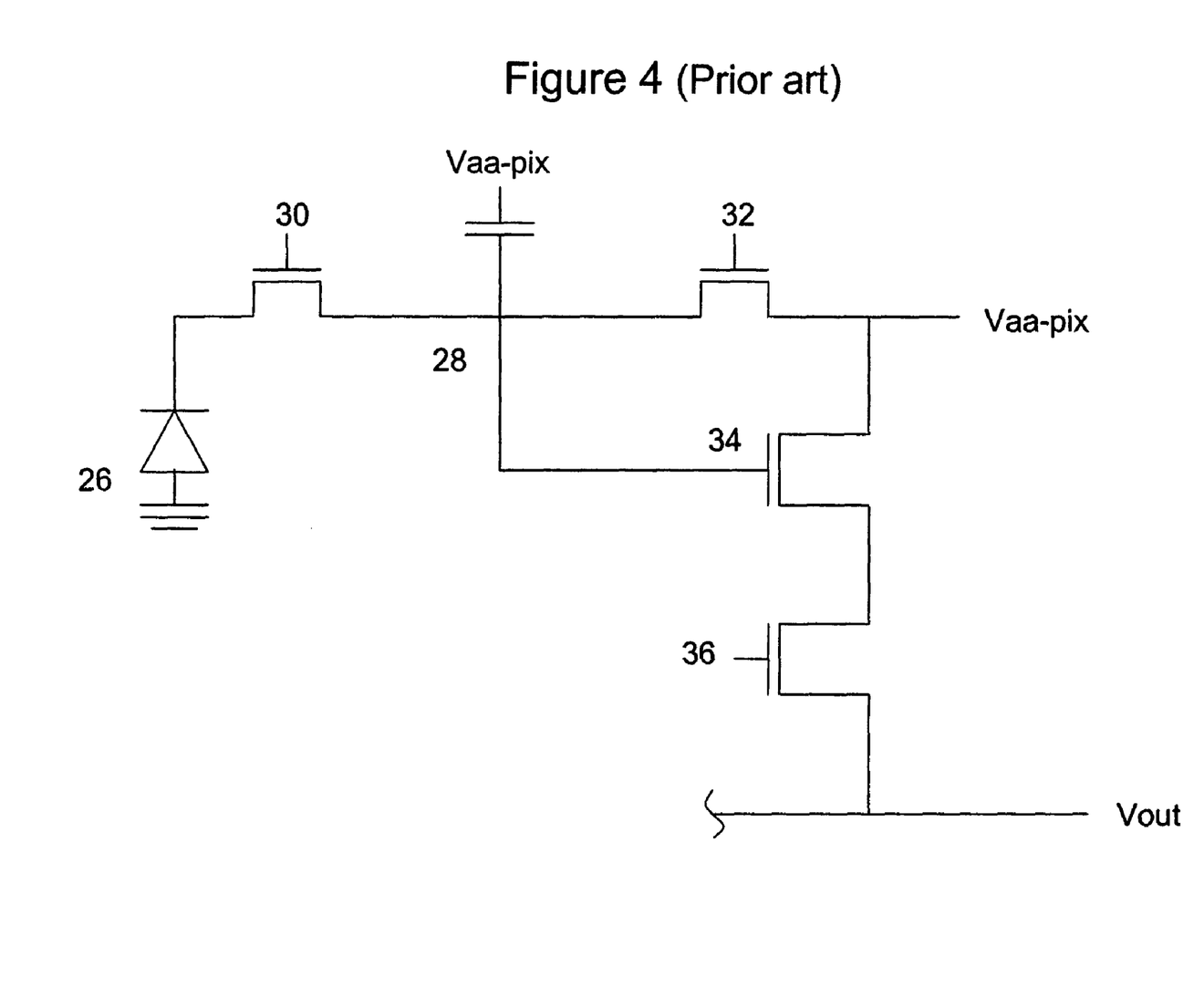
FIG. 4 is a block diagram of an imaging device.

Referring now to the drawings, where like elements are designated by like reference numerals, FIG. 4 illustrates a schematic diagram of a conventional four-transistor (4T) pixel cell. Each of the conventional pixels comprises a photosensor 26, for example, a photogate, photoconductor or a photodiode overlying a substrate for producing a photo-generated charge in a doped region of the substrate. A readout circuit is provided for each pixel cell and includes at least a source follower transistor 34 and a row select transistor 36 for coupling the output of the source follower transistor 34 to a column output line. The pixel cell also typically has a floating diffusion node 28, connected to the gate of the source follower transistor 34. Charge generated by the photosensor 26 is sent to the floating diffusion region 26. The imager may also include a transfer gate 30 for transferring charge from the photosensor 26 to the floating diffusion node 27 and a reset transistor 32 for resetting the floating diffusion region node to a predetermined charge level prior to charge transference.

Figure 5:
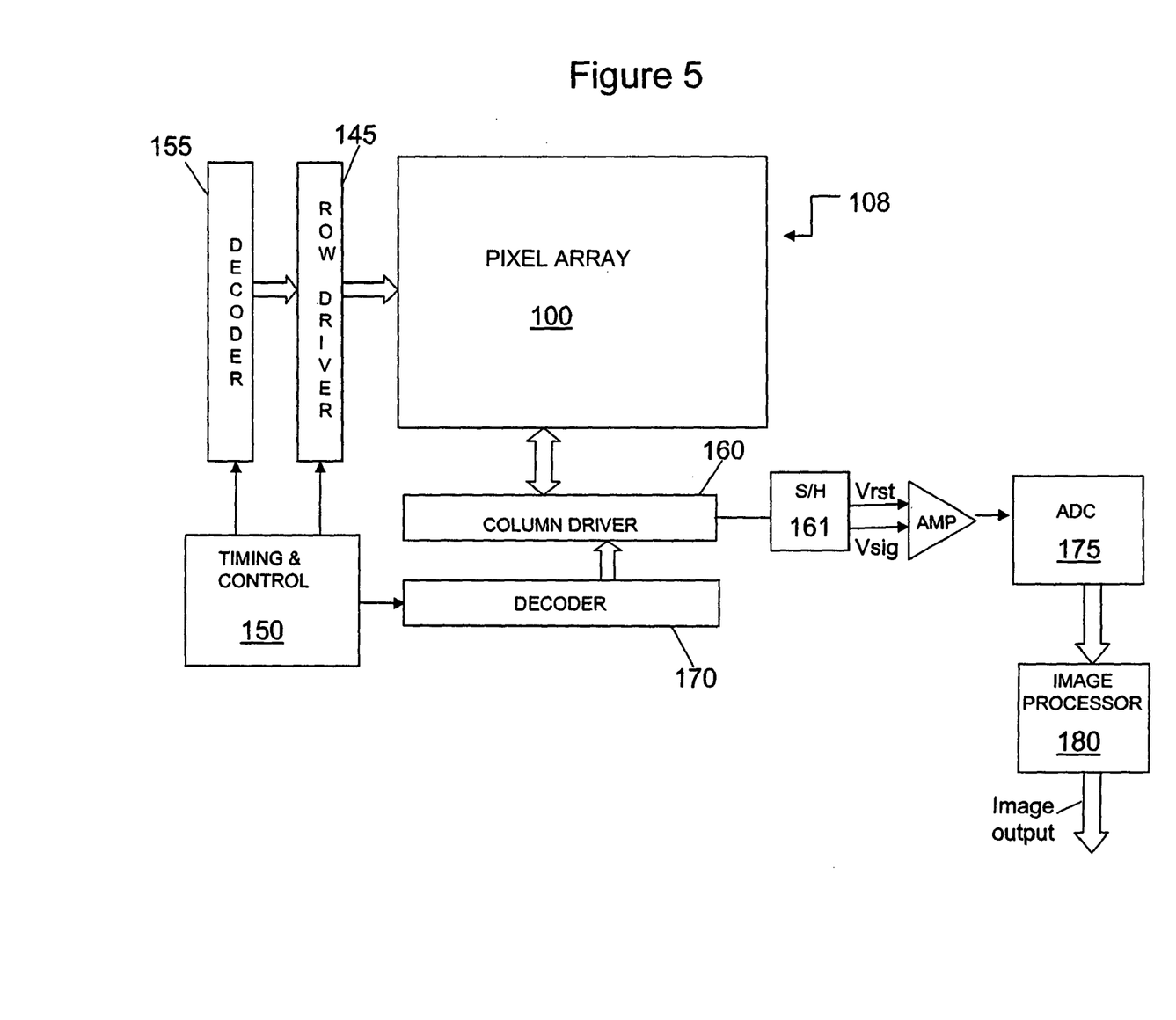
FIG. 5 is a schematic diagram of a four-transistor (4T) pixel cell of prior art.

FIG. 5 illustrates a block diagram of a CMOS imager device 108 having a pixel array 100 with each pixel cell being constructed as described above. The pixel array 100 comprises a plurality of pixels arranged in a predetermined number of columns and rows. The pixels of each row in the array 100 are all turned on at the same time by a row select line, and the pixels of each column are selectively output by respective column select lines. A plurality of row and column lines are provided for the entire array 100. The row lines are selectively activated by a row driver 145 in response to a row address decoder 155. The column select lines are selectively activated by a column driver 160 in response to a column address decoder 170. Thus, a row and column address is provided for each pixel.

The CMOS imager 100 is operated by a control circuit 150 that controls address decoders 155, 170 for selecting the appropriate row and column lines for pixel readout, and row and column driver circuitry 145, 160 that apply driving voltage to the drive transistors of the selected row and column lines. The pixel column signals, which typically include a pixel reset signal Vrst and a pixel image signal Vsig for each row selected pixel in a column are read by sample and hold circuitry 161 associated with the column device 160. A differential signal Vrst−Vsig is produced for each pixel, which is amplified and digitized by analog-to-digital converter 175. The analog-to-digital converter 175 converts the analog pixel signals to digital signals that are fed to an image processor 180 to form a digital image output.

Color pixel arrays are often comprised of groups of four pixels having different color filters over them, as in a Bayer pattern, in order to capture light information from the visible spectrum. A portion of a conventional Bayer pattern pixel array is depicted in FIG. 1. In a Bayer pattern, each group of four pixels has one pixel with a red color filter, one pixel with a blue color filter, and two pixels with green color filters. When processed, the green data provides not only chrominance information, but as its peak response is close to the peak response of the human eye, it is also used for luminance information. Other color filter patterns may contain cyan, magenta, and yellow color filters, which will also capture light information from the visible spectrum.

Figure 2:
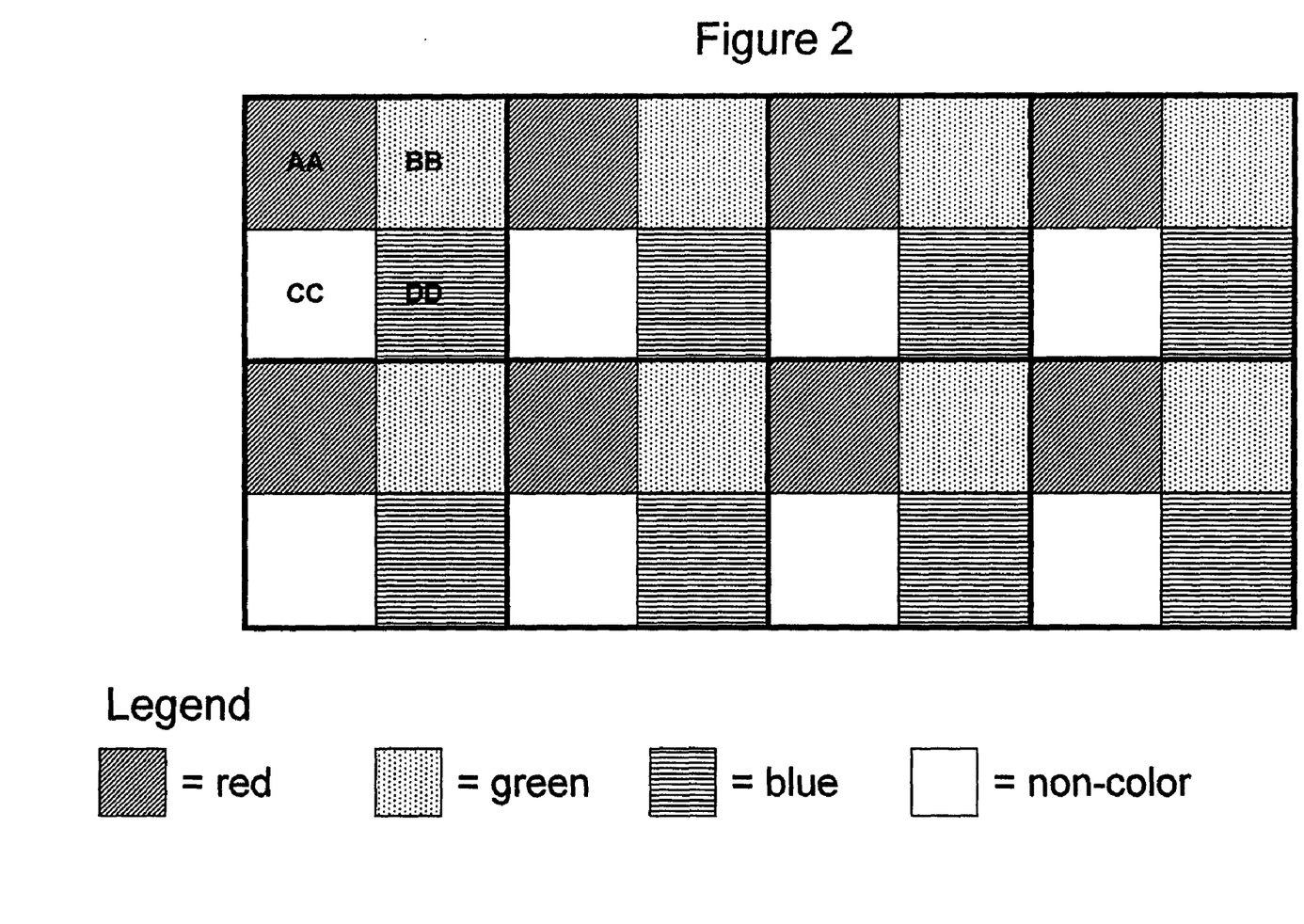
FIG. 2 depicts a pixel array according to one embodiment of the present invention.

According to one exemplary embodiment of the present invention, at least one of the pixels with a color filter in a Bayer pattern array may be replaced with a pixel without any color filter, as shown in FIG. 2. In the embodiment illustrated, one of the two green color filtered pixels is replaced by a pixel without a color filter. A red color filtered pixel AA and a green color filtered pixel BB share a first row and an unfiltered pixel CC and a blue color filtered pixel DD share a second row, such that the red color filtered pixel AA shares a first column with unfiltered pixel CC and the green color filtered pixel BB shares a second column with blue color filtered pixel DD.

Because the color filters diminish transmissivity, the color filtered pixels in such an array will saturate slower than the unfiltered pixels. Accordingly, the non-color filtered pixel may be provided with a shorter integration time than the color-filtered pixels. Additionally, when a pixel is provided to capture light intensity, size, shape and brightness information, rather than color, it may be possible to take advantage of near-infrared (NIR) energy. As such, when replacing one of the color filtered pixels with a non-color filtered pixel, a NIR filter may also be eliminated from the non-pixel in order to capture light information from the non-visible spectrum. Therefore, there will be three pixels capturing light from the visible spectrum and one pixel capturing light from the visible and non-visible spectrum.

In one exemplary embodiment, the integration times for readout of each pixel may be coordinated by the timing and control circuit 150, addressing appropriate row and column lines for pixel readout after the end of each pixel's integration time.

Figure 6:
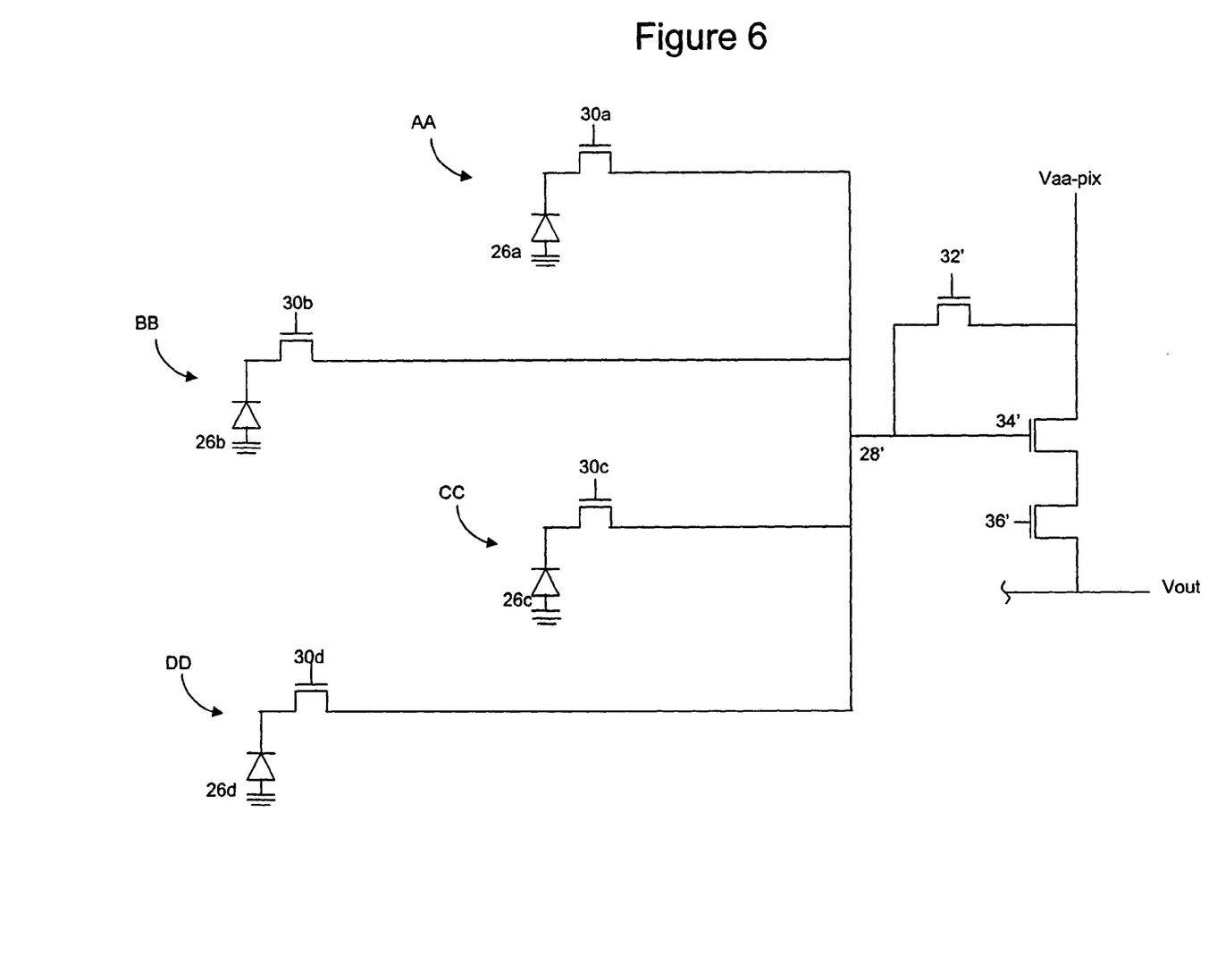
FIG. 6 is a schematic diagram of a four-pixel cell group according to the embodiment of FIG. 2.

In another exemplary embodiment, each group of four pixels AA-DD in FIG. 2 shares one readout circuit. The readout circuit typically comprises floating diffusion node, reset gate, source follower transistor, and row select transistor. As shown in FIG. 6, pixel AA has a photosensor 26a and transfer gate 30a, pixel BB has a photosensor 26b and transfer gate 30b, pixel CC has a photosensor 26c and transfer gate 30c, and pixel DD has a photosensor 26d and transfer gate 30d. Unlike the pixel cells of prior art, each of these pixels AA-DD do not have their own readout circuits. Rather, all four pixels share a floating diffusion node 28', reset gate 32', source follower transistor 34', and row select transistor 36' in, for example, a shared-row, shared-column architecture.

Figure 7:
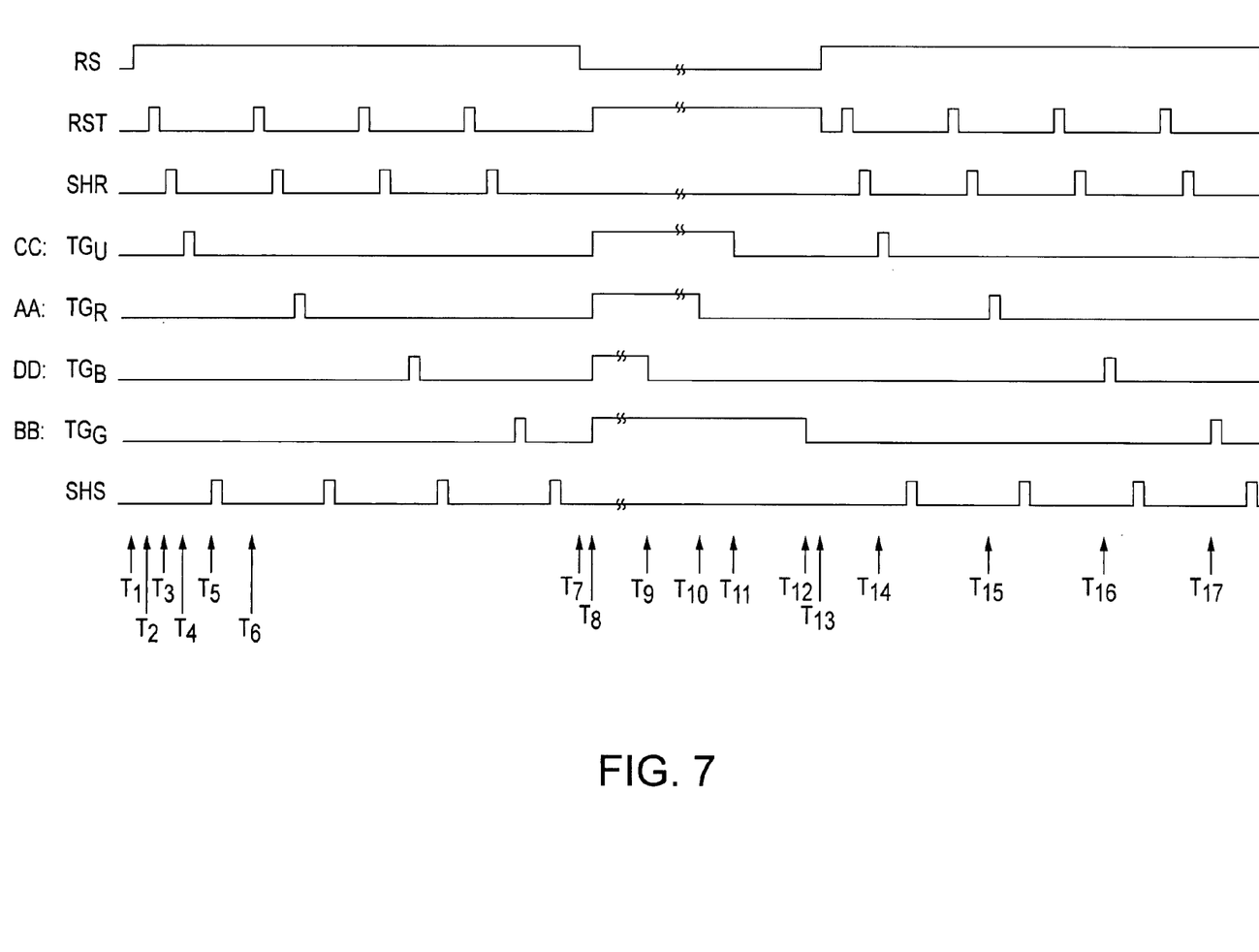
FIG. 7 is a timing diagram illustrating the operation of the pixel cell of FIG. 6.

Once the charges are generated by the photosensors 26a-d, respective transfer gates 30a-d transfer the charges one at a time to the floating diffusion node and are applied to the readout circuit one at a time. FIG. 7 illustrates exemplary charge integration and transfer gate timing diagrams for the pixel cells AA-DD according to the present invention. The signals in FIG. 7 can be provided by timing and control circuitry similar to circuitry 150 in FIG. 5. The timing diagram of FIG. 7 begins at a point in time of readout of previously accumulated charges in the pixels AA, BB, CC, and DD.

At T1, the row select transistor 36' (RS) is turned on. Each of the pixels AA-DD have accumulated charges that are sampled individually for readout. The order of readout can be in any order desired. For illustration, FIG. 7 shows readout in the order of pixels CC, AA, DD, and BB. At time T2, the reset transistor 32' (RST) is pulsed and the sample and hold reset circuit (SHR) takes a reset signal sample Vrst-CC at time T3. Then the non-color filtered pixel CC is sampled after its transfer gate 30c (TGU) is pulsed at time T4, followed by a pulse of the sample and hold signal circuit (SHS) taking the output signal Vsig-CC at time T5. The reset transistor 32' (RST) is pulsed again at T6 to begin the cycle for sampling the red color filtered pixel AA (TGR). Sample and hold reset circuit (SHR) and sample and hold signal circuit (SHS) are also pulsed similarly in the process of sampling the reset level Vrst-AA and signal level Vsig-AA of the red color filtered pixel AA. The cycle repeats for the DD and BB pixels, each time pulsing a different transfer gate, until all pixels AA-DD have been sampled, in terms of a reset signal Vrst and pixel output signal Vsig. At time T7, the row select transistor 36' (RS) is turned off as another row gets sampled. It should be noted that in this architecture, two rows of pixels are actually read out, with the red and green color filtered pixels being in a first row and the non-color filtered and blue color filtered pixels being in a second row. After these two rows are read, the next two rows are read. Also in this architecture, two adjacent pixels in a row share a column line.

At time T8, all of the transfer gates and the reset transistor are turned on to dump any residual photodiode charges and reset the circuit in preparation for charge integration. Each pixel then begins its own charge integration period when the transfer gate turns off, i.e., TGU, TGR, TGB, TGG go low. The integration period ends when the transfer gate of a pixel turns on again to transfer charge to the floating diffusion region. The beginning of each pixel's integration period is controlled by the timing and control for the pixel array, which may be hard coded based on the transmissivity of each color filter or dynamically controlled for different lighting conditions.

Thus, in FIG. 7, the blue color filtered pixel DD starts its integration period first, at time T9, when the transfer gate 30*d* (TGB) is closed. The blue color filtered pixel DD starts its integration period at time T9, when the transfer gate 30*b* (TGB) is closed. At time T1, the red color filtered pixel AA starts its integration period when the transfer gate 30*a* (TGR) is closed, the non-color filtered pixel CC starts its integration period at time T11 when the transfer gate 30*c* (TGU) is closed, and the green color filtered pixel BB starts its integration period at time T12 when the transfer gate 30*b* (TGG) is closed. After T12, all of the pixels AA-DD are integrating. That is, they are all collecting incident light and converting the photons into charge and storing them in their respective photosensors 26*a-d*. At time T13, the row select 36' (RS) is turned on, to begin the readout period for the pixels which proceeds as discussed above with respect to time periods T1 to T7.

As shown in FIG. 7, the charge integration period of pixel AA is (T10-T15), the charge integration period of pixel BB is (T12-T17), the charge integration period of pixel CC is (T11-T14), and the charge integration period of pixel DD is (T9-T16). The charge integration periods may be set based on the sensitivity of the pixel and its ability to capture light given the transmissivity of the color filter over it. In the example described above, blue color filtered pixels tend to be less sensitive to light and therefore require a longer integration time to accumulate charge. Therefore, a blue color filtered pixel DD may have the longest charge integration period. Similarly, an non-color filtered pixel CC may have a shorter charge integration time, since non-color filtered pixels saturate faster. It is also possible to set all the color filtered pixels to the same charge integration period, while setting the non-color filtered pixel to the shortest integration time. It should be noted that the order in which the pixels are sampled is not limited to the order described above. The timing of operation of the four pixel group, as described above, is only an illustration of how the integration and readout periods can be arranged.

For simplicity, the circuit shown in FIG. 6 illustrates one group of four pixels. However, this four-pixel group would be repeated throughout a pixel array 100 in FIG. 5. By replacing a color filtered pixel with an non-color filtered pixel throughout the array, the benefits of both color sensitivity and light sensitivity may be achieved simultaneously in the pixel array.

Figure 3:
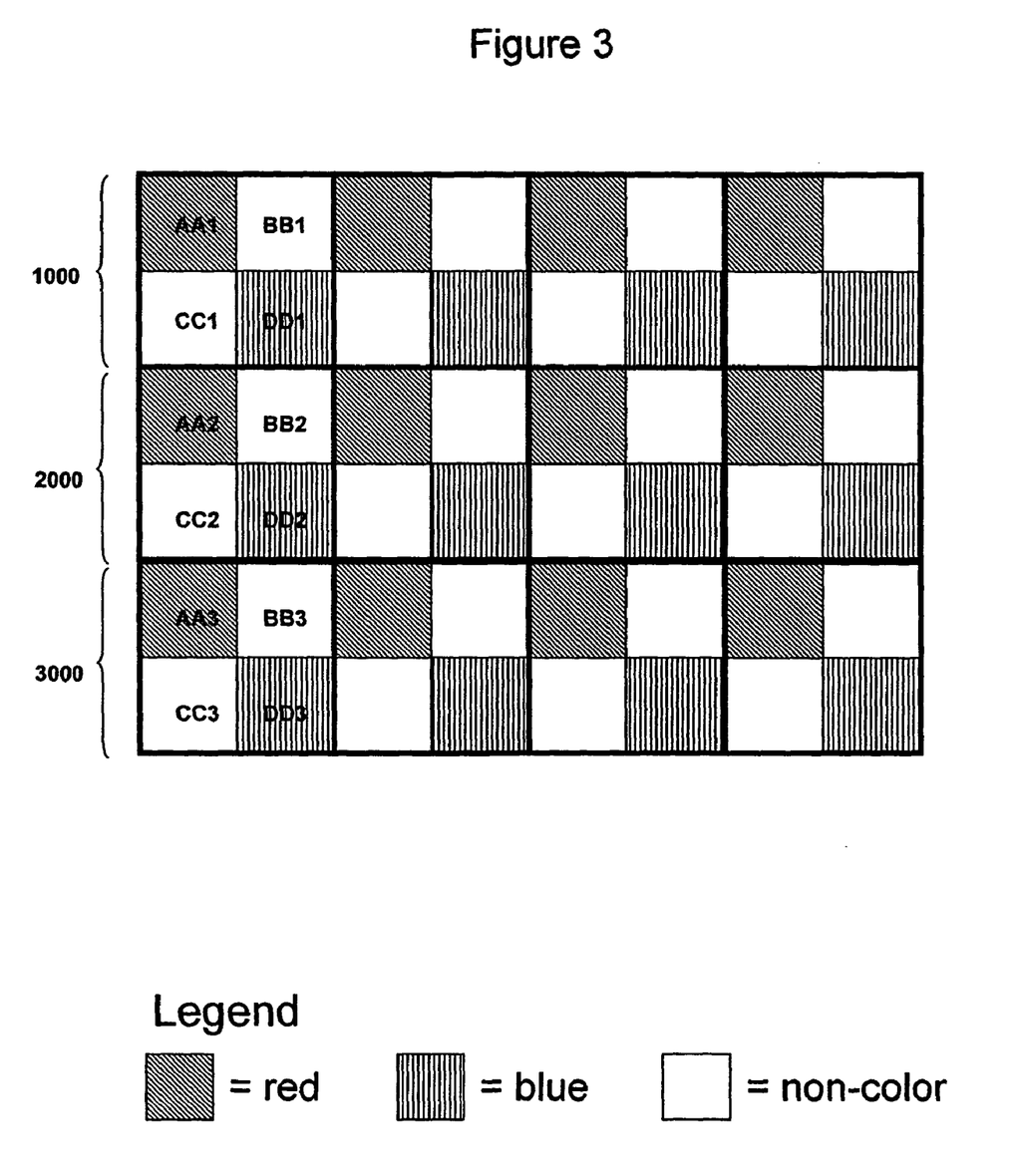
FIG. 3 depicts a pixel array according to another embodiment of the present invention.

FIG. 3 illustrates another embodiment of the present invention, where both green color filtered pixels are replaced by an non-color filtered pixel. Therefore, the 2×2 pixel group will have a red color filtered pixel and an non-color filtered pixel in the first row and an non-color filtered pixel and a blue color filtered pixel in the second row. Because two pixels in the four-pixel grouping are color filtered pixels and two pixels are non-color filter, there may effectively be two different integration times: one short integration time for the non-color filtered pixels and one longer integration time for the color filtered pixels. However, individual charge integration times can also be set for each pixel, if desired.

Since, in this embodiment, there is no green color filtered pixel, the image processor 180 of FIG. 5 will perform a subtraction logic function to determine what portion of charge from the non-color filtered pixels was from the green spectrum, based on the charge collected from adjacent red and blue color filtered pixels.

It should be noted that the four-pixel groups of this embodiment (FIG. 3) would be repeated throughout a pixel array 100 in FIG. 5.

Prior art techniques for color response balance involves applying electronic gain to weaker output signals. However, when electronic gain is applied, noise is amplified along with the signal, which is not desirable. According to the present invention, the color response can be balanced, by varying the integration times for each color channel, to correct for the differences in filter transmissivity and silicon absorption by wavelength within the pixel, rather than by applying electronic gain.

In the exemplary embodiments of the present invention, color channels may be sampled separately, with each having its own charge integration period. When pixel arrays have various integration times for groups of pixels within the array, there is a potential problem with temporal displacement of the colors of an object moving in the scene. This may also be corrected for in back-end processing, for example, in the image processor 180 of FIG. 5. Using the same back-end processing as for color temporal displacement, motion blur may also be corrected since the non-color filtered pixels have a very short integration time with respect to the other pixels, providing a frame of reference for interpolating from earlier moments in the motion.

Figure 8:
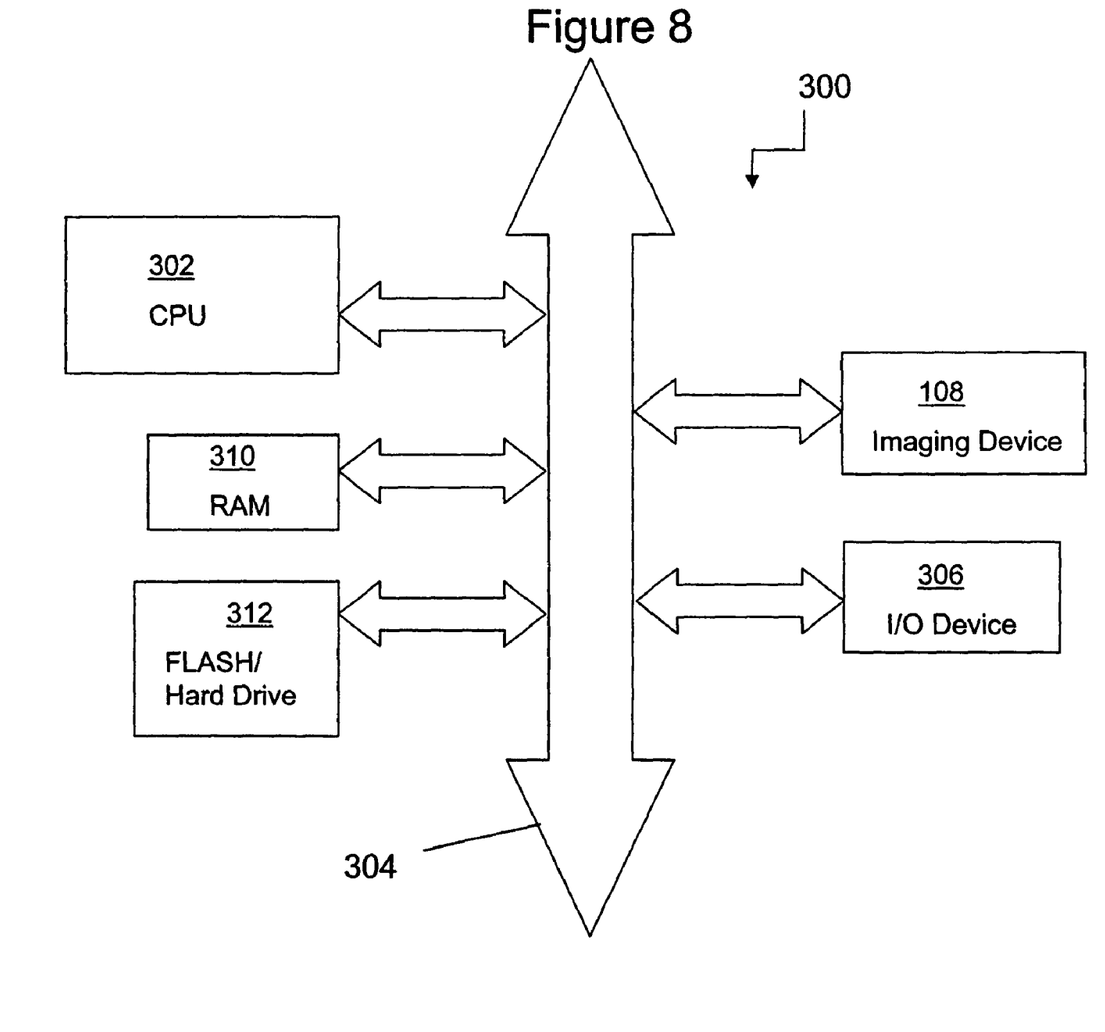
FIG. 8 shows a camera device incorporating at least one imager device constructed in accordance with an embodiment of the invention.

As noted, four-pixel groups as described above may be repeated and used in a pixel array 100 of the imager device 108 illustrated in FIG. 5. FIG. 8 shows a camera device 300, a typical processor-based camera device modified to include an imager device 108 (FIG. 5) employing pixels of the present invention as an input device to the device 300. The imager device 108 may also receive control or other data from camera device 300 as well.

Camera device 300 includes a central processing unit (CPU) 302 that communicates with various devices over a bus 304. Some of the devices connected to the bus 304 provide communication into and out of the system 300, illustratively including an input/output (I/O) device 306 and imager device 108. Other devices connected to the bus 304 provide memory, illustratively including a random access memory system (RAM) 310, and a peripheral memory device such as FLASH or hard drive memory 312.

Figure 9:
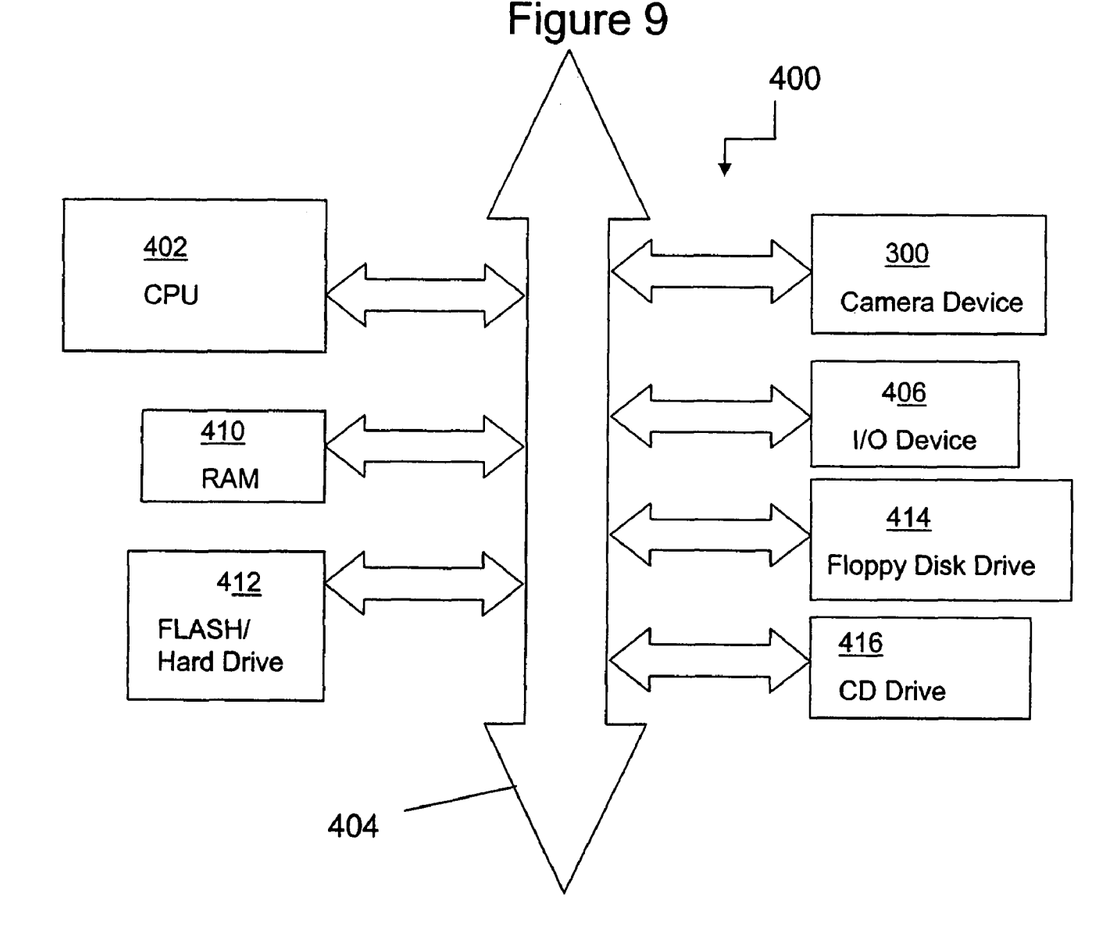
FIG. 9 shows a processor system incorporating at least one imager device constructed in accordance with an embodiment of the invention.

The camera device 300 may also be included in a processor-based camera system 400, as illustrated in FIG. 9. Examples of processor-based camera systems 400 which may employ the camera device 300, include, without limitation, computer systems, camera systems, scanners, machine vision systems, vehicle navigation systems, video telephones, surveillance systems, auto focus systems, star tracker systems, motion detection systems, image stabilization systems, and others.

System 400 includes a central processing unit (CPU) 402 that communicates with various devices over a bus 404. Some of the devices connected to the bus 404 provide communication into and out of the system 400, illustratively including an input/output (I/O) device 406 and camera device 300. Other devices connected to the bus 404 provide memory, illustratively including a random access memory system (RAM) 410, FLASH or hard drive 412, and one or more peripheral memory devices such as a floppy disk drive 414 and compact disk (CD) drive 416. The camera device 300 may be combined with a processor, such as a CPU, digital signal processor, or microprocessor, in a single integrated circuit.

In another embodiment (not illustrated), it may be desirable to provide the pixel array of the present invention on an SOC imager device such that the processing may be performed on the imager.

The above description and drawings are only to be considered illustrative of exemplary embodiments which achieve the features and advantages of the invention. Modification of, and substitutions to, specific process conditions and structures can be made without departing from the spirit and scope of the invention. Accordingly, the invention is not to be considered as being limited by the foregoing description and drawings, but is only limited by the scope of the appended claims.

What is claimed as new and desired to be protected by Letters Patent of the United States is:

1. A pixel array comprising:
   a plurality of pixels, each pixel comprising a photosensor that produces photo-generated charges during an integration period,
   wherein said plurality of pixels are organized into groups of pixels, each group of pixels including at least two color filtered pixels and at least one non-color filtered pixel, wherein each said group of pixels comprises four pixels arranged on two rows, and
   wherein at least two of said color filtered pixels and said at least one non-color filtered pixel of each said group each have integration periods that start and end at different times, and said integration period of said at least one non-color filtered pixel occurs during at least a portion of said integration periods of said color filtered pixels.

2. The pixel array of claim 1, wherein said at least one non-color filtered pixel has a shorter charge integration period than the color filtered pixels.

3. The pixel array of claim 1, wherein said at least one non-color filtered pixel is not filtered for near-infrared wavelengths.

4. The pixel array of claim 1, wherein said at least one non-color filtered pixel is filtered for near-infrared wavelengths.

5. The pixel array of claim 1, wherein each group of pixels includes a red filtered pixel, a blue filtered pixel, a green filtered pixel, and a non-color filtered pixel.

6. The pixel array of claim 1, wherein each group of pixels includes a red filtered pixel and a blue filtered pixel.

7. The pixel array of claim 6, wherein each group of pixels further includes two non-color filtered pixels.

8. The pixel array of claim 1, wherein each group of pixels includes a cyan filtered pixel, a magenta filtered pixel, and a yellow filtered pixel.

9. The pixel array of claim 1, wherein each group of pixels shares one readout circuit.

10. The pixel array of claim 5, wherein said integration period of said non-color filtered pixel is a shortest integration period, said red filtered pixel has a second integration period that is longer than said shortest integration period, said green filtered pixel has a third integration period that is longer than said second integration period, and said blue filtered pixel has a longest integration period that is longer than said third integration period.

11. The pixel array of claim 7, wherein said red and blue filtered pixels have a first integration period, wherein said first integration period is longer than said integration period of said at least one non-color filtered pixel.

12. A pixel array comprising:
    a plurality of pixels, each pixel comprising a photosensor that produces photo-generated charges during an integration period,
    wherein a first subset of said plurality of pixels are red color filtered pixels having a first integration period, a second subset of said plurality of pixels are blue color filtered pixels having a second integration period, and a third subset of said plurality of pixels are non-color filtered pixels having a third integration period,
    wherein said first, second, and third integration periods all start and end at different times, and said first and second integration periods at least partially overlap said third integration period, and
    wherein said plurality of pixels are organized into groups of pixels with each group of pixels including at least one pixel from each of said first, second, and third subsets, and wherein each said group of pixels comprises four pixels arranged on two rows.

13. The pixel array of claim 12, wherein
    said first integration period has a first duration and the second integration period has a second duration, the first and second durations being substantially equal, and
    said third integration period has a third duration that differs from said first and second durations.

14. The pixel array of claim 13, wherein said first and second durations are longer than said third duration.

15. The pixel array of claim 12, wherein said first, second, and third integration periods have respective first, second, and third durations, wherein said first, second, and third durations are different.

16. The pixel array of claim 12, wherein said non-color filtered pixels are not filtered for non-visible near-infrared wavelengths.

17. The pixel array of claim 12, further comprising a fourth subset of said plurality of pixels that are green filtered pixels having a fourth integration period with a fourth duration, wherein said fourth integration period starts and ends at different times than said first, second, and third integration periods.

18. The pixel array of claim 17, wherein said third duration is shorter than said first, second, and fourth durations.

19. The pixel array of claim 12, wherein all pixels in each said group of pixels share a common readout circuit.

20. The pixel array of claim 18, wherein each group of said groups of pixels includes at least one pixel from each of said first, second, third, and fourth subsets and wherein all pixels in said group share a common readout circuit.

21. An imaging device comprising:
a pixel array including a plurality of pixels, each pixel having a photosensor that produces photo-generated charges during an integration period, wherein a first subset of said plurality of pixels are pixels having a first integration period of a first duration, a second subset of said plurality of pixels are pixels having a second integration period of a second duration, and a third subset of said plurality of filtered pixels are pixels having a third integration period of a third duration, and wherein the pixels of said first subset are non-color filtered and the pixels of said second and third subsets are each color filtered, said plurality of pixels being organized into groups of pixels with each group of pixels including at least one pixel from each of said first, second, and third subsets, and wherein each said group of pixels comprises four pixels arranged on two rows;
a timing and control unit for controlling said first, second, and third durations such that said first duration is shorter than said second and third durations and said first duration occurs during at least a portion of said second and third durations, wherein said first, second, and third integration periods all start and end at different times; and
an image processor that corrects effects that result from said different integration periods of said first, second, and third subsets using signals read out from said first subset.

22. The imaging device of claim 21, wherein said image processor corrects temporal displacement of colors that results from the different integration periods of said first, second, and third subsets.

23. The imaging device of claim 21, wherein said image processor corrects motion blur by interpolating color data based on signals from said first subset of pixels.

24. A method of operating a pixel array comprising:
generating charges with a first plurality of photosensors during a first integration period;
generating charges with a second plurality of photosensors during a second integration period;
generating charges with a third plurality of photosensors during a third integration period;
transferring charges from said first plurality of photosensors to readout circuitry after said first integration period;
transferring charges from said second plurality of photosensors to readout circuitry after said second integration period; and
transferring charges from said third plurality of photosensors to readout circuitry after said third integration period,
wherein photosensors of said third plurality of photosensors receive non-color filtered incident light,
wherein said third integration period occurs during at least a portion of said first and second integration periods and said first, second, and third integration periods start and end at different times, and
wherein said first, second, and third pluralities of photosensors are organized into groups of photosensors with each group of photosensors including at least one pixel from each of said first, second, and third pluralities, and wherein each said group of photosensors comprises four photosensors arranged on two rows.

25. The method of claim 24, wherein said first integration period begins before said second integration period.

26. The method of claim 24, wherein said first integration period ends before said second integration period.

27. The method of claim 24 further comprising:
generating charges with a fourth plurality of photosensors during a fourth integration period; and
transferring charges from said fourth plurality of photosensors to readout circuitry after said fourth integration period.

28. The method of claim 27, wherein said third integration period occurs during at least a portion of said first, second, and fourth integration periods.

29. The method of claim 28, wherein said first, second, third, and fourth integration periods start and end at different times.

30. The method of claim 24, wherein said third integration period has a shortest duration.

31. A method of operating an imaging device comprising:
generating charges from color filtered incident light of a first color with a first plurality of photosensors in a row of a pixel array during a first integration period;
transferring charges from said first plurality of photosensors to readout circuitry after said first integration period;
generating charges from non-color filtered incident light with a second plurality of photosensors in said row of said pixel array during a second integration period, said first and second integration periods starting and ending at different times;
transferring charges from said second plurality of photosensors to said readout circuitry after said second integration period;
generating charges from color filtered incident light of a second color with a third plurality of photosensors in another row of a pixel array during a third integration period;
transferring charges from said third plurality of photosensors to said readout circuitry after said third integration period;
controlling said first, second, and third integration periods such that said second integration period is shorter than said first and third integration periods and occurs during at least a portion of said first and third integration periods; and
correcting effects resulting from said different integration periods of said first, second, and third pluralities of photosensors using signals read out from said second plurality of photosensors.

32. The method of claim 31, further comprising interpolating color information by subtracting signals from said first plurality or said third plurality of photosensors out of signals from said second plurality of photosensors.

33. The method of claim 31, wherein said step of correcting signals includes correcting temporal displacement of colors resulting from the different integration periods using signals read out from said second plurality of photosensors.

34. The method of claim 31, further comprising correcting motion blur using signals read out from said second plurality of photosensors.

* * * * *